United States Patent
Matsuoka et al.

(10) Patent No.: US 6,315,090 B2
(45) Date of Patent: *Nov. 13, 2001

(54) DISK BRAKE

(75) Inventors: Yoshinori Matsuoka; Shoji Ichikawa, both of Wako (JP)

(73) Assignee: Honda Giken Kogyo Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/723,889

(22) Filed: Oct. 1, 1996

(30) Foreign Application Priority Data

Oct. 2, 1995 (JP) .................................................. 7-255375

(51) Int. Cl.$^7$ .................................................. F16D 65/807
(52) U.S. Cl. .................................................. 188/218 XL
(58) Field of Search .................................. 188/18 A, 218 XL, 188/264 A, 264 AA; 192/113.2, 113.21, 113.22, 113.23

(56) References Cited

U.S. PATENT DOCUMENTS

| | | | | |
|---|---|---|---|---|
| 2,380,085 | * | 7/1945 | Tack et al. ..................... | 188/218 XL |
| 4,638,891 | * | 1/1987 | Wirth ............................. | 188/218 XL |
| 4,749,065 | * | 6/1988 | Loeber ........................... | 188/218 XL |
| 5,107,966 | * | 4/1992 | Metzler et al. ................ | 188/264 AA |
| 5,161,652 | * | 11/1992 | Suzuki ........................... | 188/218 XL |
| 5,460,249 | * | 10/1995 | Aoko .............................. | 188/218 KL |
| 5,544,726 | * | 8/1996 | Topouzian et al. ............. | 188/264 A |

FOREIGN PATENT DOCUMENTS

2698425 * 5/1994 (FR) .............................. 188/218 XL

* cited by examiner

*Primary Examiner*—Christopher P. Schwartz
(74) *Attorney, Agent, or Firm*—Carrier, Blackman & Associates, P.C.; Joseph P. Carrier; William D. Blackman

(57) ABSTRACT

A solid disk of a disk brake has a hat and a disk element which are joined to each other by a junction. The junction has a plurality of communication holes defined therein which provides communication between opposite sliding surfaces of the disk element. First cooling air flows along one of the sliding surface of the disk element, and second cooling air flows smoothly through the communication holes along the opposite sliding surface of the disk element for effectively cooling the disk element in its entirety.

20 Claims, 7 Drawing Sheets

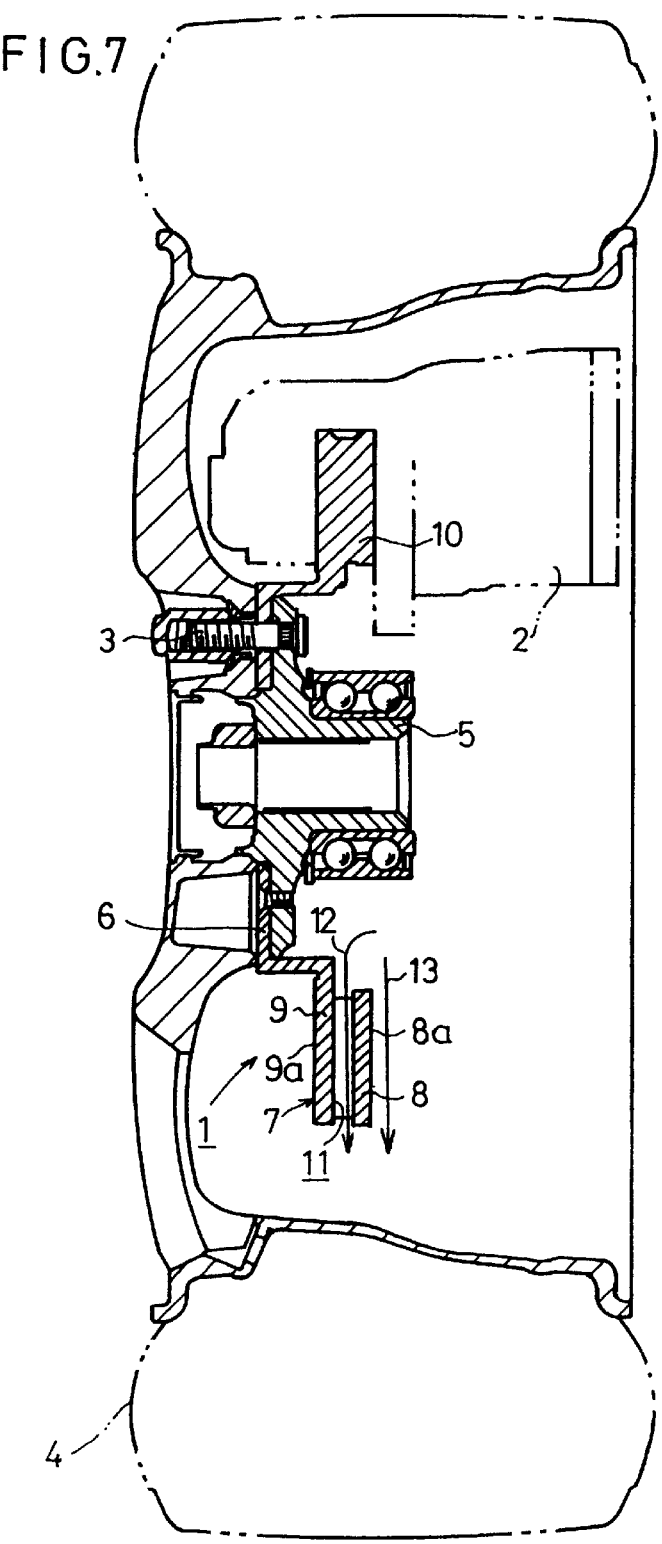

DISK BRAKE

BACKGROUND OF THE INVENTION

1. Field of the Invention

The present invention relates to a disk brake having a disk rotor which can be braked by a brake caliper.

2. Description of the Related Art

Disk brakes which have a disk rotor which can be braked by a brake caliper are well known in the art as a brake system for a motor vehicle such as an automobile or the like. The disk rotor may be a solid disk which comprises a single circular plate or a ventilated disk which comprises two annular circular plates with a cooling air passage defined therebetween.

FIG. 7 of the accompanying drawings schematically shows a disk brake having a disk rotor in the form of a ventilated disk which is in general use. As shown in FIG. 7, when a braking force is applied from a brake caliper 2 to a ventilated disk 1, the speed of rotation of a wheel 4 which is fastened to the ventilated disk 1 by wheel bolts 3 is reduced.

The ventilated disk 1 comprises a hat 6 which accommodates a hub unit 5 supporting the wheel 4 and a disk element 7 for receiving a braking force from the brake caliper 2. The disk element 7 has first and second annular circular plates 8, 9 extending parallel to each other, with cooling fins 10 and a cooling passage 11 interposed therebetween. The second annular circular plate 9 is integrally joined to the hat 6.

When a braking force is applied from the brake caliper 2 to the disk element 7 while the wheel 4 is in rotation, the disk element 7 generates a considerable amount of heat by frictional contact with the brake caliper 2. At this time, cooling air 12 flows through the cooling passage 11 between the first and second annular circular plates 8, 9, causing the cooling fins 10 to cool the disk element 7. The ventilated disk 1 is disposed in the wheel 4. Therefore, while an inner sliding surface 8a of the first annular circular plate 8 is cooled by cooling air 13, an outer slide surface 9a of the second annular circular plate 9 is not exposed to much cooling air, and cannot sufficiently be cooled.

Solid disk brake systems also suffer the same problem as with the ventilated disk 1.

SUMMARY OF THE INVENTION

It is a major object of the present invention to provide a disk brake which is capable of uniformly and effectively cooling a disk element as a whole that receives a braking force from a brake caliper.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 7 is a vertical cross-sectional view of a conventional disk brake.

DETAILED DESCRIPTION OF THE PREFERRED EMBODIMENTS

Figure 1:
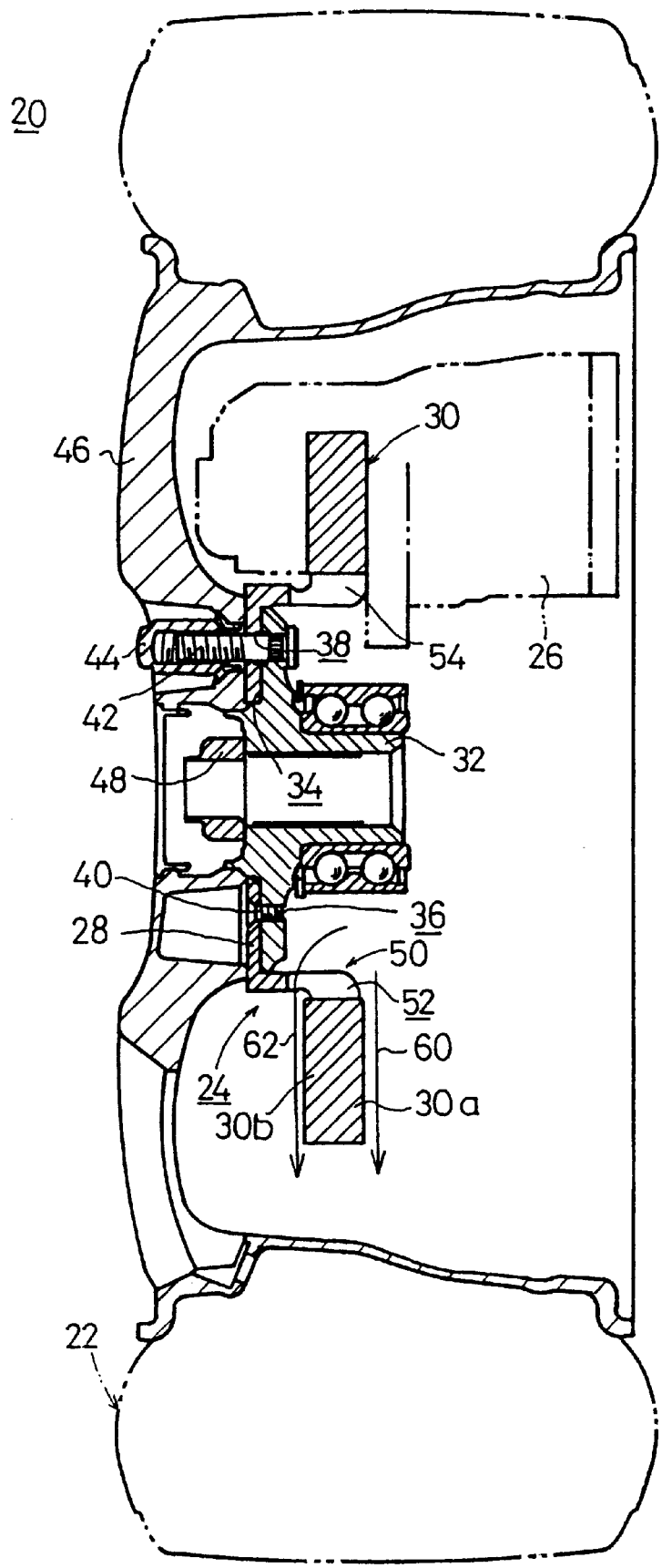
FIG. 1 is a vertical cross-sectional view of a disk brake according to a first embodiment of the present invention.

FIG. 1 shows in vertical cross section a disk brake 20 according to a first embodiment of the present invention.

As shown in FIG. 1, the disk brake 20 comprises a solid disk 24 as a disk rotor which rotates in unison with a wheel 22 and a brake caliper 26 for applying a braking force to the solid disk 24 to reduce the speed of rotation of the wheel 22.

The solid disk 24 has an integral unitary structure which comprises a hat 28 and a disk element 30 which can be contacted by pads (not shown) of the disk caliper 26. The hat 28 has a central through hole 34 defined axially therein which receives a hub unit 32. The hat 28 also has a plurality of first holes 36 and a plurality of second holes 38 defined therein at given angular intervals around the through hole 34 (see also FIG. 2).

As shown in FIG. 1, screws 40 are threaded through the respective first holes 36 into the hub unit 32, thereby fastening the hub unit 32 to the hat 28. Wheel bolts 42 mounted on the hub unit 32 are inserted through the respective second holes 38, and wheel nuts 44 are threaded over the respective wheel bolts 42, thereby integrally fastening a wheel body 46 of the wheel 22 to the hat 28 and the hub unit 32. A spindle (not shown) is inserted in the hub unit 32, and a spindle nut 48 is threaded over the projecting tip end of the spindle.

Figure 2:
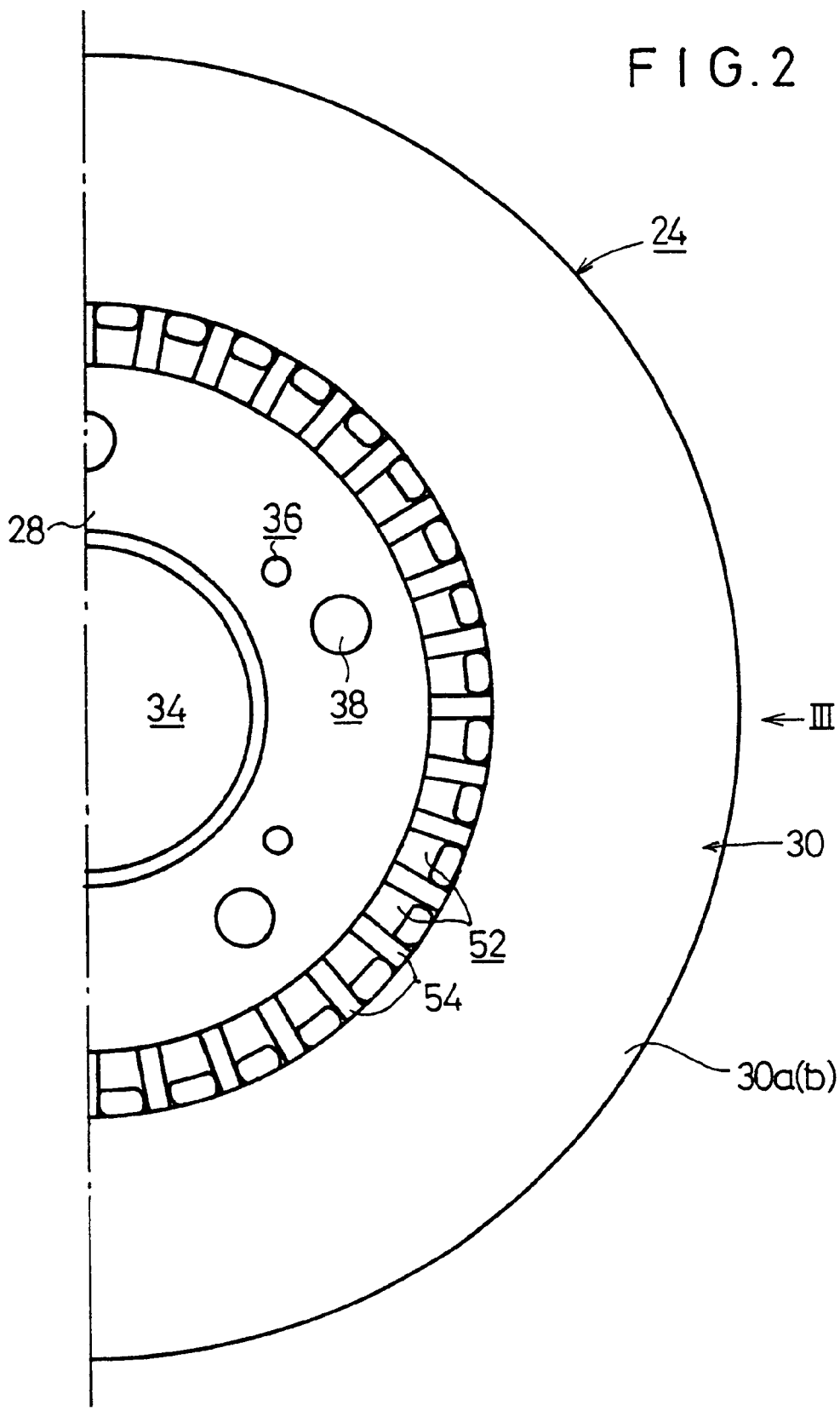
FIG. 2 is a fragmentary front elevational view of a solid disk of the disk brake shown in FIG. 1.
Figure 3:
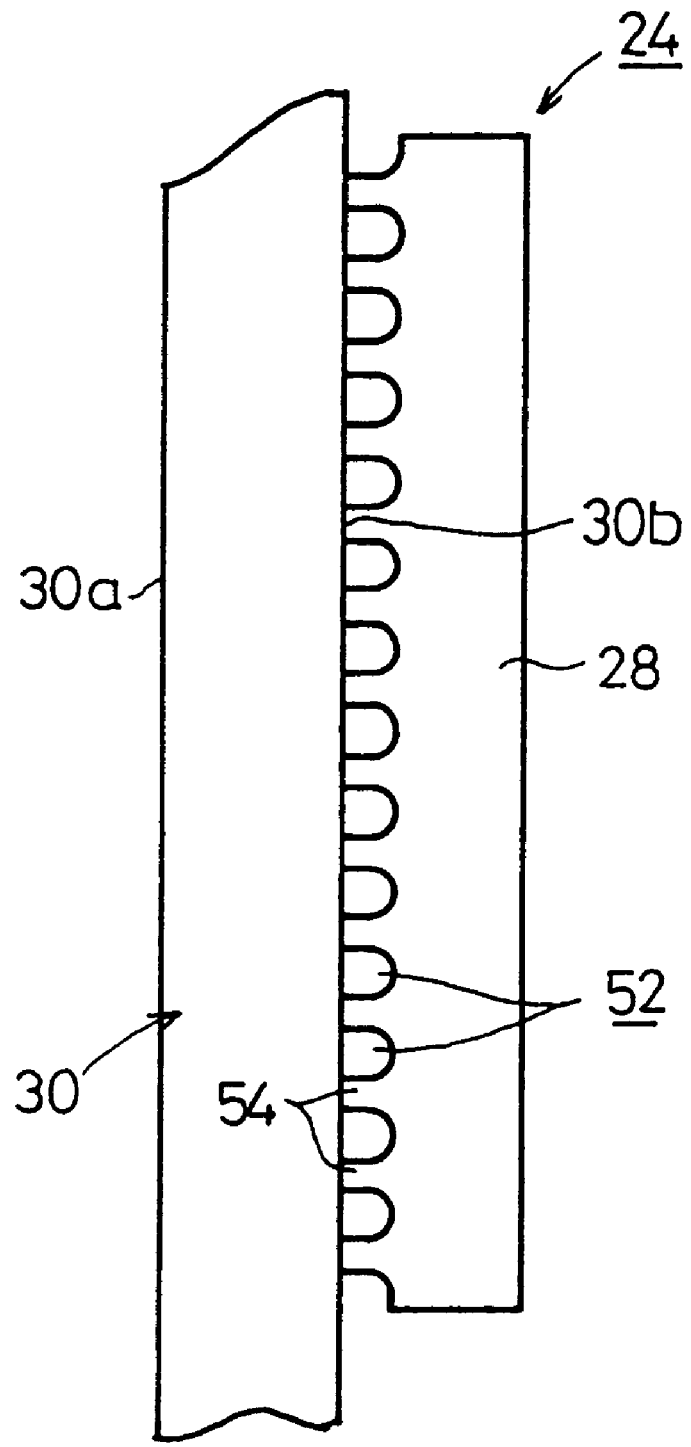
FIG. 3 is a fragmentary side elevational view of the solid disk as viewed in the direction indicated by the arrow III in FIG. 2.

As shown in FIGS. 1 through 3, the solid disk 24 has a plurality of communication holes 52 defined in a junction 50 between the hat 28 and the disk element 30 and providing communication between opposite first and second sliding surfaces 30a, 30b of the disk element 30. The communication holes 52 are spaced at equal angular intervals around the through hole 34 and have portions extending radially and axially of the solid disk 24. The communication holes 52 are circumferentially spaced by narrow rims 54 of the solid disk 24. The rims 54 function as junction members joining an inner end face of the hat 28 (the face directed inwardly of the wheel body 46) and a radially inner periphery of the disk element 30.

Operation of the disk brake 20 according to the first embodiment will be described below.

When a braking force is applied to the disk element 30 of the solid disk 24 from the brake caliper 26 while the wheel 22 is in rotation, it reduces the speed of rotation of the solid disk 24 and the wheel 22 which are fastened to the hub unit 32 by the wheel bolts 42 and the wheel nuts 44.

The first and second sliding surfaces 30a, 30b of the disk element 30 produce a considerable amount of heat because pads of the brake caliper 26 are held in frictional contact with the first and second sliding surfaces 30a, 30b. At this time, since the solid disk 24 is rotating, air flows radially outwardly from the center toward the outer edge of the solid disk 24 under centrifugal forces. Specifically, first cooling air 60 flows radially outwardly along the first sliding surface 30a of the disk element 30, cooling the first sliding surface 30a.

As described above, the communication holes 52 are defined in the junction 50 between the hat 28 and the disk element 30 and provide communication between the first and second sliding surfaces 30a, 30b of the disk element 30. Accordingly, air flows through the communication holes 52 radially outwardly toward the outer edge of the solid disk 24. Specifically, second cooling air 62 flows radially outwardly along the second sliding surface 30b of the disk element 30, cooling the second sliding surface 30b.

The second sliding surface 30b, which is positioned closely to the wheel body 46 and hence would otherwise not be exposed to much air, is therefore effectively cooled by the second cooling air 62, with the result that the disk element 30 can be cooled uniformly. Since any temperature difference between the first and second sliding surfaces 30a, 30b is minimized, preventing the solid disk 24 from being thermally deformed. Consequently, the disk brake 20 can be prevented from producing noise or shudder.

Figure 4:
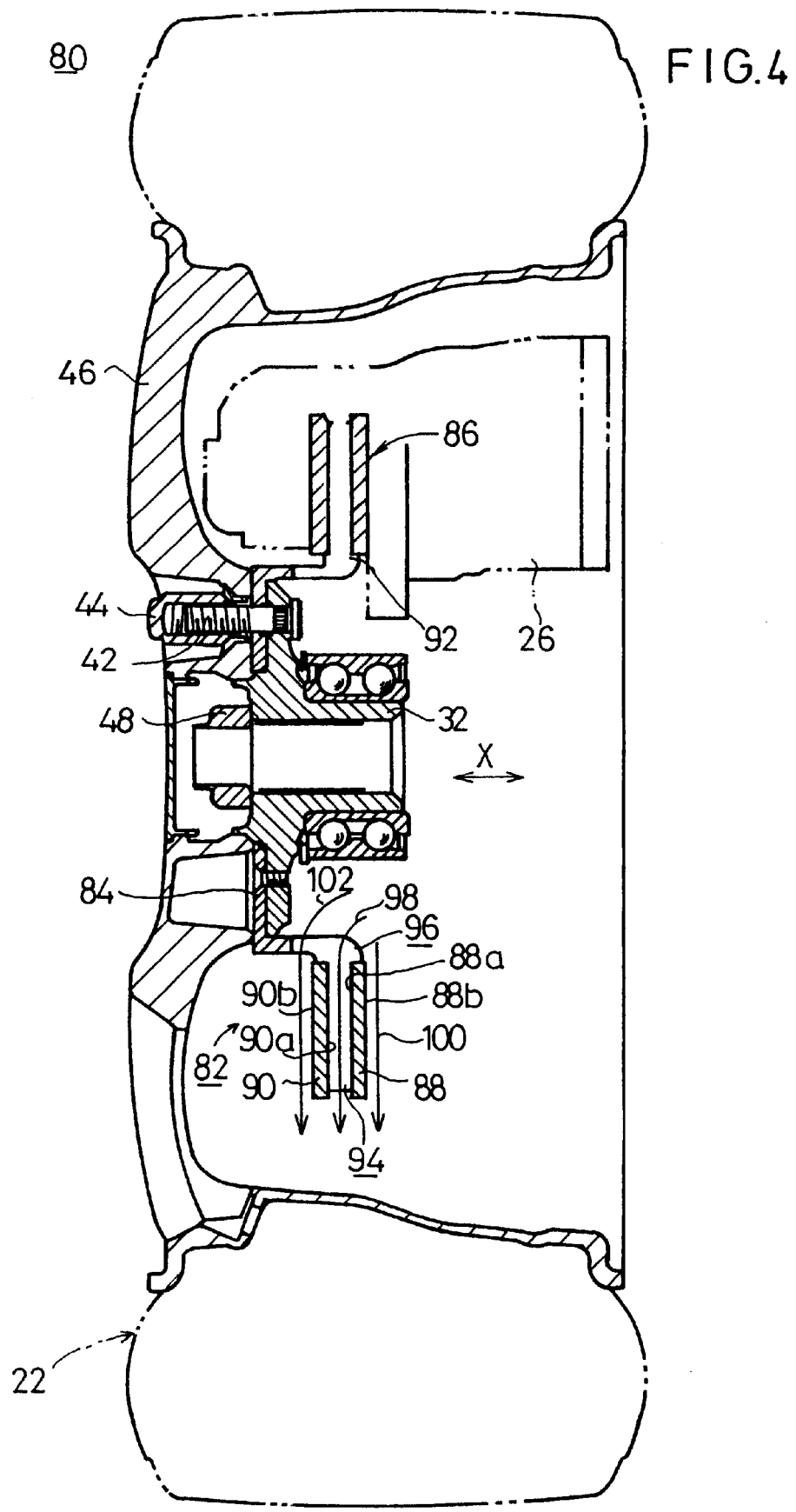
FIG. 4 is a vertical cross-sectional view of a disk brake according to a second embodiment of the present invention.

A disk brake 80 according to a second embodiment of the present invention will be described below with reference to FIGS. 4 through 6. Those parts of the disk brake 80 which are identical to those of the disk brake 20 according to the first embodiment are denoted by identical reference numerals and will not be described in detail below.

The disk brake 80 has a ventilated disk 82 as a disk rotor which comprises a hat 84 and a disk element 86. The disk element 86 comprises first and second annular circular plates 88, 90 spaced axially from each other in the direction indicated by the arrow X in FIG. 4 and extending parallel to each other, and a plurality of cooling fins 92 interconnecting confronting side surfaces 88a, 90a of the first and second annular circular plates 88, 90 and integrally joined to the hat 84.

Figure 5:
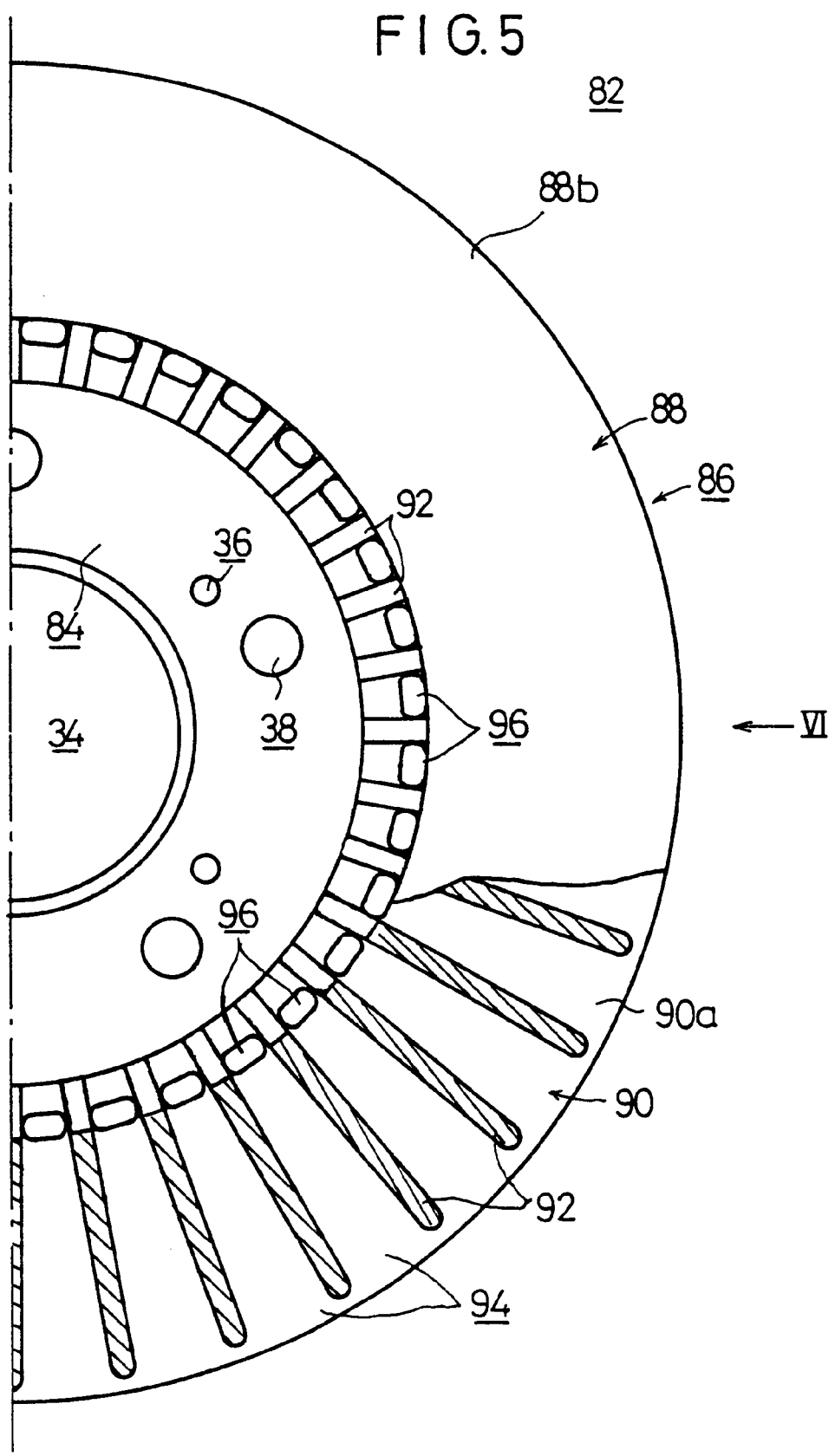
FIG. 5 is a fragmentary front elevational view of a ventilated disk of the disk brake shown in FIG. 4.
Figure 6:
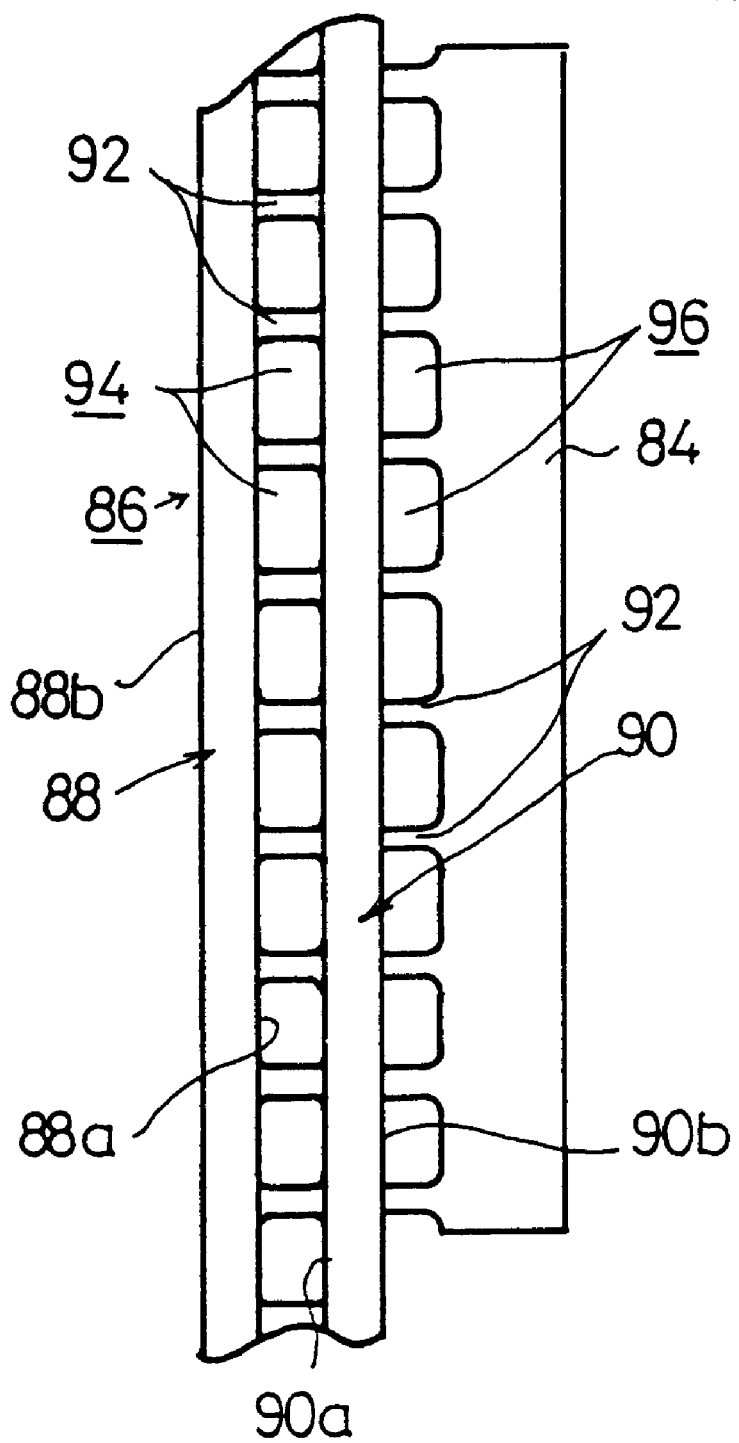
FIG. 6 is a fragmentary side elevational view of the solid disk as viewed in the direction indicated by the arrow VI in FIG. 5.

As shown in FIGS. 5 and 6, the cooling fins 92, which are in the form of a relatively thin wall, are angularly spaced at given angular intervals and extend radially. Between the cooling fins 92 and the first and second annular circular plates 88, 90, there are defined a plurality of cooling passages 94 which extend radially. As shown in FIGS. 4 and 5, only bases of the cooling fins 92 are present between inner circumferential edges of the first and second annular circular plates 88, 90 and the hat 84, i.e., in the junction between the disk element 86 and the hat 84 the fin bases function as junction members. In the junction between the disk element 86 and the hat 84, the cooling fins 92 define therebetween communication passages 96 which provide communication between a sliding surface 88b, opposite to the side surface 88a, of the first annular circular plate 88 and a sliding surface 90b, opposite to the side surface 90a, of the second annular circular plate 90.

In operation, the side surfaces 88a, 90a of the first and second annular circular plates 88, 90 are cooled by first cooling air 98 flowing through the radial cooling passages 94. The sliding surface 88b of the first annular circular plate 88 is cooled by second cooling air 100 which flows radially outwardly along the sliding surface 88b.

Third cooling air 102 smoothly flows through the communication passages 96 defined between the cooling fins 92 at the junction between the hat 84 and the disk element 86 and along the sliding surface 90b of the second annular circular plate 90, for thereby effectively cooling the sliding surface 90b with the third cooling air 102.

Therefore, the side surfaces 88a, 90a and the sliding surfaces 88b, 90b of the first and second annular circular plates 88, 90 are reliably cooled, thus uniformly cooling the disk element 86 in its entirety.

Since the disk element 86 is integrally joined to the hat 84 by the cooling fins 92 which interconnect the first and second annular circular plates 88, 90, the disk element 86 is supported at its substantially central region by the hat 84 and hence kept in a structure which is highly resistant to thermal deformation. The disk element 86 is thus reliably prevented from producing noise or shudder.

With the structure of the disk brake according to the present invention, as described above, inasmuch as the communication passages 96 are defined in the junction between the hat and the disk element and provide communication between the sliding surfaces of the disk element, the sliding surfaces are reliably supplied with cooling air for uniformly cooling the disk element as a whole.

If the disk rotor comprises a solid disk, then communication holes may be defined as the communication passages in the junction between the hat and the disk element. If the disk rotor comprises a ventilated disk, then the cooling fins interconnecting the first and second annular circular plates of the disk element may be integrally joined to the hat, defining the communication passages in the junction between the cooling fins and the hat for providing communication between the sliding surfaces of the disk element through the cooling fins. Because the disk element is supported at its substantially central region by the hat through the cooling fins, the disk element is effectively prevented from being thermally deformed.

Although certain preferred embodiments of the present invention have been shown and described in detail, it should be understood that various changes and modifications may be made therein without departing from the scope of the appended claims.

What is claimed is:

1. A disk brake rotor for a brake having a disk caliper, the rotor comprising:
    a hat for accommodating a hub unit which supports a wheel;
    a disk element spaced apart from said hat, and including opposite sliding surfaces slidingly engageable by said disk caliper for receiving braking force applied by said disk caliper;
    a plurality of junction members connected between an axially inner end face of said hat to a radially inner periphery of said disk element; and
    a plurality of communication passages being defined between said junction members and providing communication between said sliding surfaces.

2. A disk brake rotor according to claim 1, wherein said rotor comprises a ventilated disk, said disk element comprising:
    first and second annular circular plates spaced axially from each other and extending parallel to each other, said first and second annular circular plates having respective confronting side surfaces; and
    a plurality of cooling fins interconnecting said confronting side surfaces and said junction members are bases of said cooling fins.

3. A disk brake rotor according to claim 2, wherein said cooling fins are spaced at angular intervals and extend radially between the circular plates, defining a plurality of radially extending cooling passages between said cooling fins and said first and second annular circular plates.

4. A disk brake rotor according to claim 2, wherein the junction members and the communication passages extend both radially and axially of the rotor.

5. A disk brake rotor according to claim 2, wherein the junction members are the sole connection between said disk element and said hat.

6. A disk brake rotor according to claim 1, wherein the junction members are J-shaped when viewed from the side, such that the axially inner end face of the hat is spaced axially and radially from the radially inner periphery of the disk element by the junction members.

7. A disk brake comprising:

a disk caliper for applying a braking force; and a disk rotor having a hat for accommodating a hub unit which supports a wheel and a disk element for receiving the braking force applied by said disk caliper, adjacent edges of said hat and said disk element being spaced from each other in radial and axial directions relative to said rotor, said adjacent edges being joined to each other by a junction, said disk element having opposite sliding surfaces slidingly engageable by said disk caliper;

said disk rotor having plurality of communication passages defined in said junction and providing communication between said sliding surfaces;

said disk rotor comprises a solid disk; and said junction between said hat and disk element having a plurality of communication holes defined therein as said communication passages.

8. A disk brake according to claim 7, wherein said hat has a central through hole defined axially therein, said communication holes being defined at equal angular intervals around said through hole.

9. A disk brake according to claim 8, wherein said communication holes have portions extending radially and axially of said solid disk.

10. A disk brake according to claim 9, wherein each of said communication holes have portions which extend axially and radially of said solid disk.

11. A disk brake according to claim 7, wherein said communication holes have portions extending radially and axially of said solid disk.

12. A disk brake according to claim 11, wherein each of said communication holes have portions which extend axially and radially of said solid disk.

13. A disk brake rotor for a brake having a disk caliper, the rotor comprising:

a raised central portion for accommodating a hub unit;

a disk element spaced apart from said raised central portion, and including opposite sliding surfaces slidingly engageable by said disk caliper for receiving braking force applied by said disk caliper;

a plurality of junction members connected between an axially inner end face of said raised central portion to a radially inner periphery of said disk element; and cooling means for cooling said opposite sliding surfaces of said disk element as it is rotated, said cooling means comprising a plurality of communication passages defined between said junction members and providing communication between said opposite sliding surfaces.

14. A disk brake rotor according to claim 13, wherein said disk element is a ventilated disk having first and second annular circular plates spaced axially from each other and extending parallel to each other, said first and second annular circular plates having respective confronting side surfaces, and a plurality of cooling fins interconnecting said confronting side surfaces;

said junction members comprise base portions of said cooling fins.

15. A disk brake rotor according to claim 14, wherein said cooling fins are spaced at angular intervals and extend radially, defining a plurality of radially extending cooling passages between said cooling fins and said first and second annular circular plates.

16. A disk brake rotor according to claim 14, wherein the junction members are the sole connection between said disk element and said raised central portion.

17. A disk brake rotor according to claim 13, wherein said junction members extend in both radial and axial directions relative to the rotor.

18. A disk brake rotor according to claim 13, wherein said communication passages are defined at equal angular intervals around said central raised portion.

19. A disk brake rotor according to claim 13, wherein the junction members are J-shaped when viewed from the side, such that the axially inner end face of the raised central portion is spaced axially and radially from the radially inner periphery of the disk element by the junction members.

20. A disk brake comprising:

a disk caliper for applying a braking force;

a disk rotor having a raised central portion for accommodating a hub unit and a disk element for receiving the braking force applied by said disk caliper, adjacent edges of said raised central portion and said disk element being joined together by a junction, said disk element having opposite sliding surfaces slidingly engageable by said disk caliper;

cooling means for cooling said opposite sliding surfaces of said disk element as it is rotated;

said cooling means comprising a plurality of communication passages defined in said junction and providing communication between said opposite sliding surfaces;

each said communication passage having portions which extend radially and axially of said disk element; and said disk element is a solid disk, said junction between said raised central portion and disk element comprising a plurality of spaced rims connecting said adjacent edges of said raised central portion and said disk element of the disk rotor, and said communication passages are defined between adjacent ones of said spaced rims.

* * * * *

UNITED STATES PATENT AND TRADEMARK OFFICE
CERTIFICATE OF CORRECTION

PATENT NO. : 6,315,090 B2
DATED : November 13, 2001
INVENTOR(S) : Yoshinori Matsuoka and Shoji Ichikawa It is certified that error appears in the above-identified patent and that said Letters Patent is hereby corrected as shown below:

<u>Title page,</u>
Item [57], ABSTRACT, 6th line, change "surface" to -- surfaces --.

<u>Column 2,</u>
Line 48, after "30." insert the sentence -- As shown, the rims 54 are J-shaped when viewed from the side, such that the axially inner end face of the hat 28 is spaced axially and radially from the radially inner periphery of the disk element 30 by the rims 54. --.

<u>Column 3,</u>
Line 43, after "members." insert the sentence -- As shown, the fin bases are J-shaped when viewed from the side, such that the axially inner end face of the hat 28 is spaced axially and radially from the radially inner periphery of the ventilated disk 82 by the fin bases. --.

<u>Column 4,</u>
Line 8, delete "96".
Line 41, change "to" to -- and --.

<u>Column 5,</u>
Line 18, after "having" insert -- a --.
Line 49, change "to" to -- and --.

Signed and Sealed this

Second Day of July, 2002

*Attest:*

JAMES E. ROGAN
*Director of the United States Patent and Trademark Office*

*Attesting Officer*